United States Patent [19]

Nagasawa et al.

[11] Patent Number: 4,575,104
[45] Date of Patent: Mar. 11, 1986

[54] RADIAL TYPE LIQUID SEAL WITH BEND PREVENTING MEANS

[75] Inventors: Shinji Nagasawa, Fukushima; Toshiki Ono, Fujisawa; Masaharu Suehiro, Fukushima, all of Japan

[73] Assignee: Nippon Oil Seal Industry Co., Ltd., Tokyo, Japan

[21] Appl. No.: 657,449

[22] Filed: Oct. 4, 1984

[30] Foreign Application Priority Data

Oct. 4, 1983 [JP] Japan ................... 58-185676

[51] Int. Cl.⁴ .............................. F16J 15/32
[52] U.S. Cl. ...................... 277/153; 277/11; 277/166
[58] Field of Search ............. 277/1, 9, 9.5, 11, 134, 277/152, 153, 166

[56] References Cited

U.S. PATENT DOCUMENTS

| | | | |
|---|---|---|---|
| 2,867,457 | 1/1959 | Riesing et al. | 277/153 |
| 3,341,265 | 9/1967 | Paterson | 277/153 X |
| 3,501,155 | 3/1970 | Dega et al. | 277/134 X |
| 3,746,351 | 7/1973 | Tucker | 277/153 |
| 4,350,347 | 9/1982 | Heinrich | 277/153 |
| 4,357,026 | 11/1982 | Panchetti | 277/153 |
| 4,410,190 | 10/1983 | Potter | 277/153 |
| 4,426,094 | 1/1984 | Antonini | 277/166 X |
| 4,436,317 | 3/1984 | Schmitt | 277/134 |
| 4,447,064 | 5/1984 | Ehrmann et al. | 277/134 |

FOREIGN PATENT DOCUMENTS

| | | | |
|---|---|---|---|
| 2107648 | 8/1971 | Fed. Rep. of Germany | 277/153 |
| 2736207 | 2/1979 | Fed. Rep. of Germany | 277/134 |
| 562664 | 5/1957 | Italy | 277/153 |
| 46-36124 | 10/1971 | Japan | 277/134 |

Primary Examiner—Robert S. Ward
Attorney, Agent, or Firm—Armstrong, Nikaido, Marmelstein & Kubovcik

[57] ABSTRACT

A sealing apparatus disposed between a housing and a shaft received in the housing. The sealing apparatus has, at least, a fitting portion which is fitted to either one of the housing and the shaft, and a seal lip of an elastic material which extends axially obliquely from the fitting portion and is provided at its distal end with a seal portion. The sealing apparatus is provided with a bend preventing portion which is formed at the distal end of the seal lip such as to extend axially outwardly of the seal portion.

2 Claims, 5 Drawing Figures

RADIAL TYPE LIQUID SEAL WITH BEND PREVENTING MEANS

BACKGROUND OF THE INVENTION

1. Field of the Invention:

The present invention relates to a sealing apparatus for sealing a liquid, such as an oil. More particularly, the invention pertains to a sealing apparatus which has a main lip and is arranged such that, when a shaft is inserted into the seal apparatus, the main lip is prevented from being inverted by the inserted shaft.

2. Description of the Prior Art:

As a prior art relating to the present invention, there is a sealing apparatus such as that shown in FIG. 4. FIG. 4 is a sectional view of the conventional sealing apparatus. The sealing apparatus is composed of: an outer peripheral portion 101 which is fitted to the inner peripheral surface of a housing 100; a radial portion 102 which extends radially inward from one of the ends of the outer peripheral portion 101; a seal lip 103 which extends axially obliquely from the inner end of the radial portion 102; and a reinforcing metal ring 104 with a substantially L-shaped cross-section which is disposed such as to stretch from the inner peripheral surface of the outer peripheral portion 101 to one of the side surfaces of the radial portion 102. A seal portion 105 of a substantially V-shaped cross-section is integrally formed at the distal end of the seal lip 103. The seal portion 105 is formed such as to possess an inside diameter which is smaller than the outside diameter of a shaft 106 in order to offer a satisfactory sealing effect. For this reason, when the shaft 106 is inserted into the sealing apparatus from the side thereof which is closer to the seal portion 105 of the seal lip 103 as shown in FIG. 4, the seal lip 103 is undesirably bent by the shaft 106 in the advancing direction of the shaft 106, so that the sealing apparatus is unfavorably mounted in the state wherein the seal portion 105 is not in close contact with the shaft 106. In the case where a gutter spring 107 is fitted on the outer periphery of the seal lip 103, when the seal lip 103 is bent by the inserted shaft 106, the gutter spring 107 undesirably comes off the seal lip 103, so that the sealing apparatus is inconveniently mounted with the gutter spring 107 separated from the seal lip 103. FIG. 5 shows another example of the conventional sealing apparatus. This conventional sealing apparatus is mounted in the state wherein the seal lip 103 is undesirably bent by the inserted shaft 106. In consequence, it is not possible to expect the sealing apparatus to offer a proper shaft-sealing effect. It is to be noted that the same members or portions in FIG. 5 as those in FIG. 4 are denoted by the same reference numerals.

SUMMARY OF THE INVENTION

In view of the above-described problems of the prior art, it is a primary object of the present invention to allow a sealing apparatus to be normally mounted at all times without any possibility that the seal lip may be undesirably bent even when the shaft is inserted into the sealing apparatus from the side thereof which is closer to the distal end of the seal lip.

To this end, according to the present invention, there is provided in a sealing apparatus which is disposed between a housing and a shaft received in the housing and has, at least, a fitting portion which is fitted to either one of the housing and the shaft, and a seal lip of an elastic material which extends axially obliquely from the fitting portion and is provided at its distal end with a seal portion, the improvement comprising a bend preventing portion which is provided at the distal end portion of the seal lip such as to extends axially outwardly of the seal portion.

The sealing apparatus in accordance with the present invention, arranged as described above, offers the following characteristic effect:

By virtue of the bend preventing portion provided on the seal lip, when the shaft is inserted into the sealing apparatus, the seal lip is prevented from being bent due to the fact that the seal portion thereof is pressed by the shaft in the shaft inserting direction since the bend preventing portion abuts against the peripheral surface of the shaft being inserted, and consequently, the shaft is inserted while forcing a passage through the inner peripheral surface of the seal portion. Accordingly, when the shaft has been completely inserted in the sealing apparatus, the seal portion and the shaft are in close contact with each other, whereby it is possible to ensure the requisite sealing performance of the sealing apparatus at all times.

The above and other objects, features and advantages of the present invention will become clear from the following description of the preferred embodiments thereof, taken in conjunction with the accompanying drawings.

DESCRIPTION OF THE PREFERRED EMBODIMENTS

Embodiments of the present invention will be described hereinunder with reference to the accompanying drawings.

Figure 1:
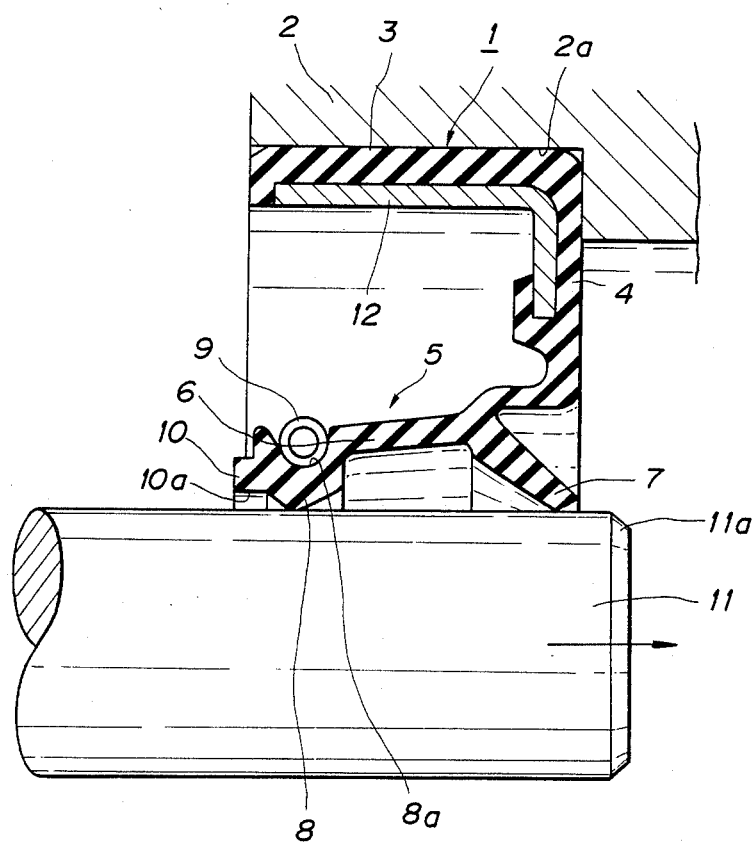
FIG. 1 is a vertically-sectioned side elevational view of a first embodiment of the sealing apparatus in accordance with the present invention.

Referring first to FIG. 1 which shows a first embodiment of the sealing apparatus in accordance with the present invention, the reference numeral 1 denotes a seal body which is made of an elastic material, such as rubber. The seal body 1 is composed of: a cylindrical outer peripheral portion 3 which is fitted to the inner peripheral surface 2a of a housing 2 having a hollow inside; a radial portion 4 which extends radially inward from one of the ends of the outer peripheral portion 3; and a seal lip 5 which is formed at the inner peripheral end of the radial portion 4. The seal lip 5 has a main lip 6 which extends axially and obliquely inward from the inner peripheral end of the radial portion 4, and a subsidiary lip 7 which extends from the root of the main lip 6 in the direction opposite to that of the main lip 6.

The main lip 6 is integrally formed at its distal end portion with a seal portion 8 of a substantially V-shaped cross-section. The seal portion 8 is provided on the outer peripheral surface thereof with an annular groove 8a, into which is fitted a gutter spring 9 which inwardly presses the seal portion 8. However, the gutter spring 9 may be omitted according to need.

The main lip 6 is integrally formed at its free end, that is, its distal end with a bend preventing portion 10 constituted by an annular projection which projects in the substantially axial direction. The bend preventing portion 10 is formed on the inner periphery thereof with an annular surface 10a which axially extends from the tapered inner surface of the seal portion 8. The axial length of the annular surface 10a is preferably set such as to be larger than the axial length of a chamfered portion 11a at the end surface of a shaft 11 which is inserted into the seal body 1. In place of the annular projection, the bend preventing portion 10 may be constituted by a plurality of projections which axially extend from the distal end of the main lip 6 and are circumferentially disposed with a proper spacing.

It is to be noted that the reference numeral 12 denotes a reinforcing ring of, for example, a metal and with an L-shaped cross-section which is disposed such as to stretch over the outer peripheral portion 3 and the radial portion 4 of the seal body 1.

When the shaft 11 is inserted into the seal body 1 from the side thereof which is closer to the main lip 6, the chamfered portion 11a at one of the ends of the shaft 11 abuts against the tapered surface of the seal portion 8, whereby the main lip 6 is urged such as to bend radially inward. At this time, however, the bend preventing portion 10 abuts against the outer peripheral surface of the shaft 11. Therefore, the main lip 6 is prevented by the bend preventing portion 10 from bending radially inward. As a result, the shaft 11 is inserted while enlarging the seal portion 8. Once the shaft 11 is inserted, the main lip 6 is no longer bent. Therefore, it is possible to fit the shaft 11 and the seal portion 8 to each other in a normal state.

Figure 2:
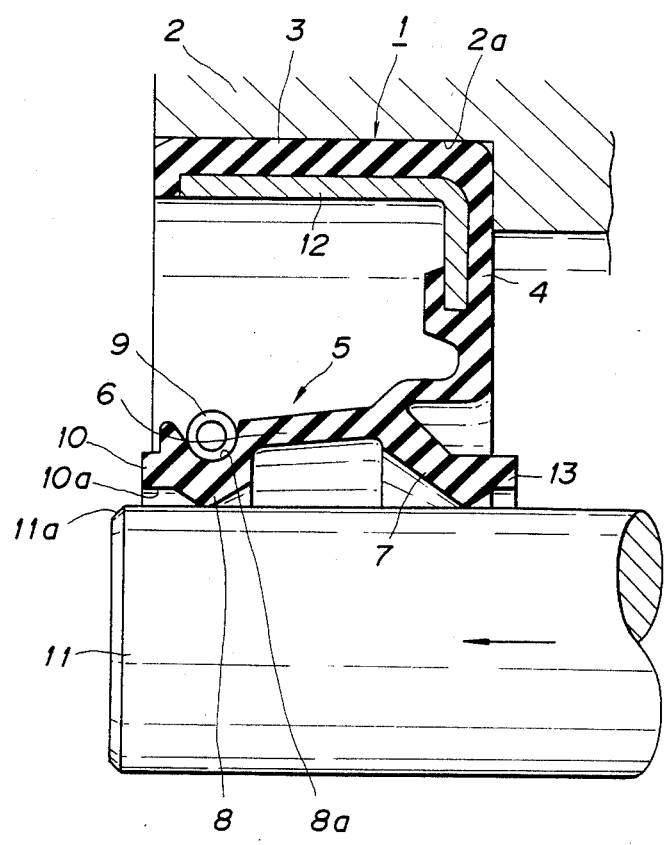
FIG. 2 is a vertically-sectioned side elevational view of a second embodiment of the sealing apparatus in accordance with the present invention.

FIG. 2 shows a second embodiment of the sealing apparatus in accordance with the present invention. In this embodiment, the subsidiary lip 7 is also integrally formed at its distal end with a bend preventing portion 13 constituted by an annular projection which axially extends from the end surface of the subsidiary lip 7. By this arrangement, when the shaft 11 is inserted into the seal body 1 from the side thereof which is closer to the subsidiary lip 7, the subsidiary lip 7 is prevented by the bend preventing portion 13 from bending radially inward. The construction, operation and effect of each of the members or portions of this embodiment other than the above-described are the same as those in the first embodiment.

Figure 3:
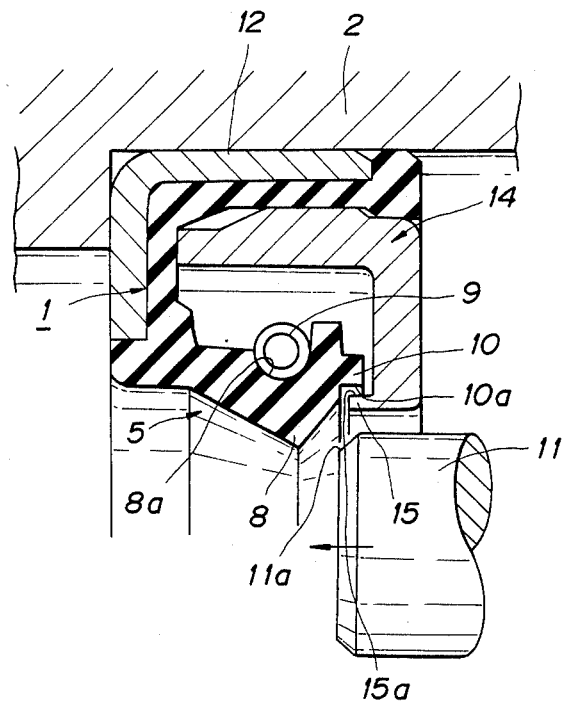
FIG. 3 is a vertically-sectioned side elevational view of a third embodiment of the sealing apparatus in accordance with the present invention.
Figure 4:
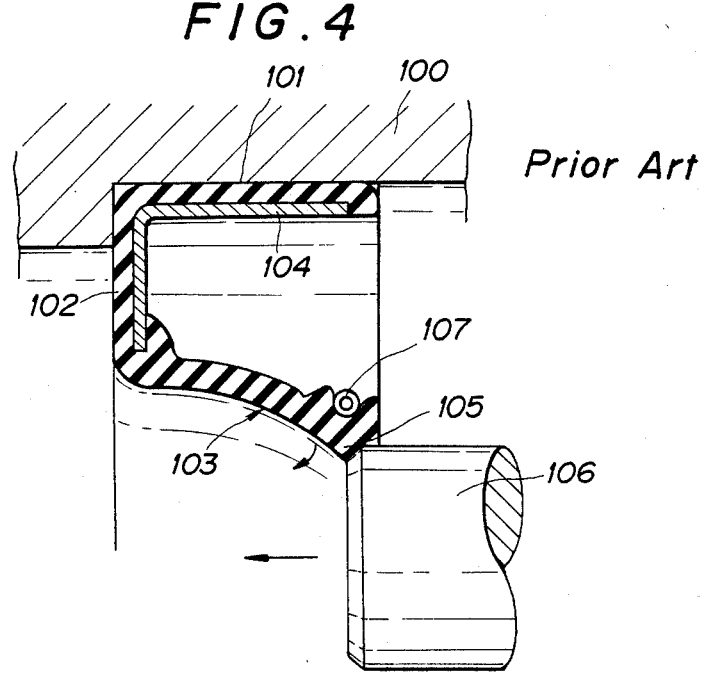
FIGS. 4 and 5 are vertically-sectioned side elevational views of conventional sealing apparatuses which are different from each other.
Figure 5:
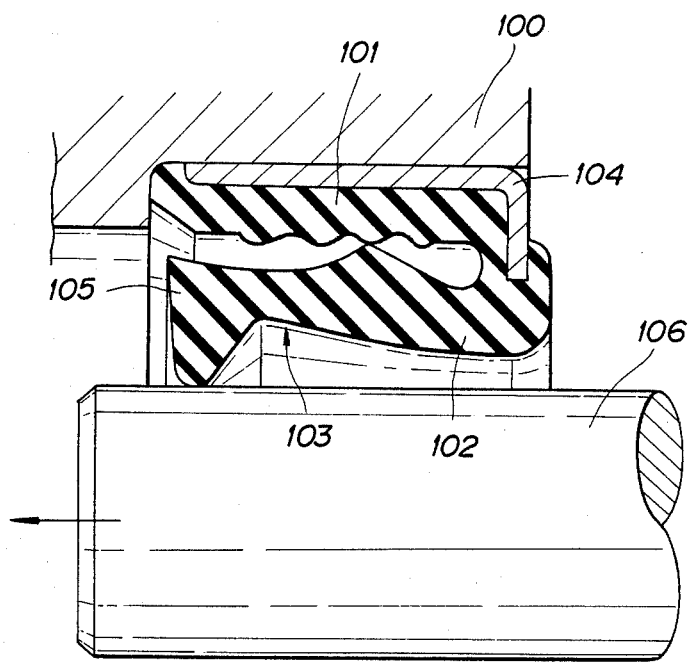

FIG. 3 shows a third embodiment of the sealing apparatus in accordance with the present invention. In this embodiment, the construction of the seal body 1 is substantially similar to that of the first embodiment except that the seal body 1 in accordance with this embodiment is not provided with the subsidiary lip. In the third embodiment, however, a support ring 14 of a substantially L-shaped cross-section is additionally provided which is fitted at the outer peripheral portion thereof to the inner surface of the outer peripheral portion 3 of the seal body 1. The support ring 14 is integrally formed at the inner peripheral end thereof with an annular projection 15 which axially extends toward the bend preventing portion 10 formed at the distal end of the seal lip 5. In this case, a minute gap is formed between the outer peripheral surface 15a of the annular projection 15 and the inner peripheral surface 10a of the bend preventing portion 10.

Thus, when the shaft 11 is inserted into the seal body 11 from the side thereof which is closer to the free end, that is, the distal end of the seal lip 5 constituted only by the main lip, the seal portion 8 is prevented from bending when abutting against the shaft 11 by the bend preventing portion 10 since the inner peripheral surface 10a thereof abuts against the outer peripheral surface 15a of the annular projection 15, thereby allowing the shaft 11 to be normally fitted into the seal lip 5.

The above-described arrangement allows the sealing apparatus to be effective even in the case where the axial length of the bend preventing portion 10 is smaller than the axial length of the chamfered portion or circular chamfered portion at one of the ends of the shaft 11. Further, when the shaft 11 and the seal lip 5 are fitted to each other, the support ring 14 serves as a guide for the shaft 11. Therefore, it is possible to easily insert the shaft 11 even when the sealing apparatus is mounted in a portion which is difficult or unable to see.

It is to be noted that, although the outer peripheral portion 3 of the seal body 1 is fitted to the inner peripheral surface 2a of the housing 2 in the above-described embodiments, an arrangement may be employed wherein the inner peripheral portion of the seal body 1 is fitted and secured to the shaft 11, and the seal lip 5 is provided on the outer peripheral side of the seal body 1 and is brought into slide contact with the inner peripheral surface 2a of the housing 2.

What is claimed is:

1. A radial type liquid seal comprising in combination:
   an annular body of elastic material disposed between two relatively moving concentrically located members and having sealing engagement with one of said members;
   a seal lip integrally formed and extending from said annular body toward the other of said members and having at its distal end an annular seal portion to provide sealing engagement with said other member;
   a bend preventing portion provided at the distal end of said seal lip and axially extending therefrom;
   a support ring secured to said annular body; and
   means on said support ring to restrict the bending of the seal lip beyond a predetermined level.

2. A radial type liquid seal as claimed in claim 1, wherein said means to restrict bending of the seal lip beyond a predetermined level comprises a projection on said support ring extending axially toward said bend preventing portion in a manner such that when said seal lip is bent excessively, said projection engages said bend preventing portion to restrict the bending of said seal lip beyond a predetermined level.

* * * * *